O. A. OLSON.
PORTABLE VALVE GRINDING MACHINE.
APPLICATION FILED JUNE 24, 1911.

1,035,996.

Patented Aug. 20, 1912.

WITNESSES:
Harry E. Schank.
Joe Roberts.

INVENTOR
Oscar A. Olson
BY
H. E. Gardiner
ATTORNEY

UNITED STATES PATENT OFFICE.

OSCAR A. OLSON, OF LINCOLN, NEBRASKA.

PORTABLE VALVE-GRINDING MACHINE.

1,035,996.

Specification of Letters Patent. Patented Aug. 20, 1912.

Application filed June 24, 1911. Serial No. 635,204.

*To all whom it may concern:*

Be it known that I, OSCAR A. OLSON, a citizen of the United States, residing at Lincoln, in the county of Lancaster and State of Nebraska, have invented certain new and useful Improvements in Portable Valve-Grinding Machines, of which the following is a specification.

My invention relates to machines used ordinarily in garages or automobile factories and repair shops, and has particular reference to means employed in the manufacture and repair of automobiles and machines of similar construction.

The object of the invention is the construction of a machine of general utility in the work suggested and one which combines in use a valve seating machine, a drill press, an emery wheel and an air pump.

The invention consists in the new and original means employed for accomplishing results and in the general arrangement and combination of parts, and their operation, as will be described and pointed out in the claims.

I have illustrated my invention in the accompanying drawing in which—

Figure 1:
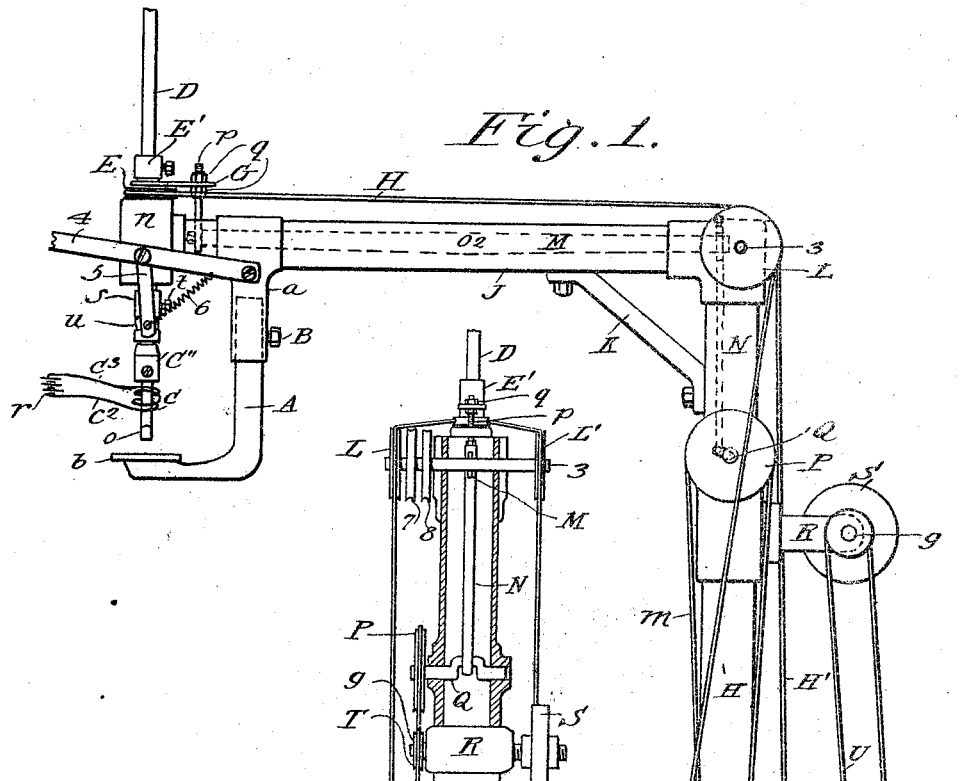
Figure 2:
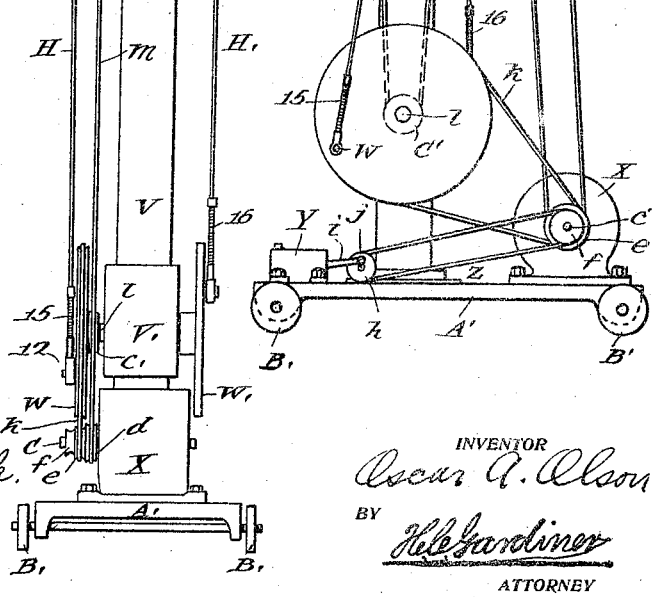

Figure 1 is a view in side elevation. Fig. 2 is an end elevation, the upper part of the frame being in cross-section and some of the details being omitted.

In the drawing A' is the platform of the machine mounted on trucks B'.

V is an upright frame mounted on the platform and supports the operating parts of the machine.

J is a horizontal arm secured to the upper end of the frame at right angles thereto and braced to the frame by the brace K. Near the outer end of the arm is secured a downwardly extending hollow lug $a$ in which is adjustably secured the upwardly extending arm A formed integrally with the table $b$, the arm being secured in the lug by a screw bolt B.

At one end of the platform a motor X is supported and operates ta shaft $c$ to which are secured pulleys $d$, $e$ and $f$. From the pulley $d$ a belt U extends to a similar pulley T secured to a shaft $g$ which revolves in suitable bearings in the end of a horizontal arm R extending from near the middle of the supporting frame. An emery wheel S is secured to the shaft and is operated by the motor in the manner described. The pulley $f$ is connected by a belt $z$ with a pulley $h$ mounted at the base of the frame and operates an air pump Y by means of the piston $i$ attached to a crank arm $j$ on the pulley $h$. The belt $z$ is omitted in Fig. 2. A belt $k$ connects the pulley $e$ with the large wheel or sheave W journaled on a shaft $l$ operating in a bearing V' near the bottom of the frame. Between the sheave W and the bearing a small sheave $c'$ is secured to the shaft and is connected by a belt $m$ to a sheave P secured to the outer end of a crank shaft Q which is pivoted in bearings in the frame above the arm R. At the opposite end of the shaft $l$ a plain wheel W' is secured and the cable ends H and H' of the cable H are pivotally secured to opposite sides of the respective wheels by means of the spring connections 15 and 16. The cable passes over the pulleys L and L' secured to the shaft 3 mounted in bearings at the top of the frame. The cable passes around the flat groove pulley E which is adjustably secured to the shaft D by means of a screw bolt F which passes through an enlarged part E' of the pulley. The shaft D is operated by the action of the cable on the pulley and is housed in bearings in the head $n$ secured to the outer end of the arm J. The cable being secured to opposite sides of the wheels W and W', and the wheels turning in one direction by the action of motor and belt, the shaft D is given a reversed motion, being turned first in one direction and then in another, a motion necessary in the true and successful grinding of valves. To the lower end of the shaft D is secured a chuck $c''$ in which the operating tool $o$ is adjusted.

When the machine is used for valve grinding the valves with their seats are placed on the table $b$ adjusted underneath. The valves when being ground are raised intermittently from their seats by the means now described. A crank arm N is pivoted at its lower end to the shaft Q and at the upper end is secured to a walking beam M, which is centrally pivoted to the pin 2 secured in the arm J. A vertical bolt $p$ is secured to the outer end of the walking beam and a horizontal plate G is secured at one end to the upper end of the bolt by means of nuts $q$. The opposite end of the plate is forked and revolubly secured to the pulley E. As the shaft Q is turned by the pulley P and belt $m$ the walking beam is given an oscillating motion and the shaft D raised by the bolt $p$ and plate G. It is quite as necessary in the successful grinding of valves that the valve be raised from its seat intermittently as that the tool operating the same be given a reversed motion.

Means are provided in connection with the manipulating tool for raising the valve from its seat as the tool is raised, or causing the valve to follow the tool. Such means consist of a magnetic battery $r$ connected to a coil C around the tool $o$ by wires $c^2$ and $c^3$. The electric current being transmitted to the tool magnetizes it and causes the valve to adhere thereto as the tool is raised by the action of the walking beam.

When the machine is used for a drill press the cable H and the belt $m$ are removed and a belt adjusted to the pulley $d$ passing around the pulley E and over the pulleys 7 and 8, which are free to revolve on the shaft 3 and idle when the drill is not in use. The operating tool is thus given a continuous motion necessary in drilling. The drill is held down upon the work by a lever 4 pivoted at one end to the lug $a$. A sleeve $s$ is adjustably secured to the shaft D above the chuck $c''$ by a screw bolt $t$ and is freely inclosed by a fork $u$ to which is secured the lower end of a rod 5, the upper end being pivoted to the lever 4. By loosening the screw bolt the tool may be pressed down by the lever and is freed from operation when the lever is released by the spring 6 which connects the rod and the lever.

The attachment of the cable ends to the wheels W and W' by means of the springs relieves the strain on the cable and the jar given by the reverse motion. The vertical motion given the operating tool by the walking beam and the reversed motion of the cable are continuous and concurrent, the machine being geared to turn the tool a certain distance in each direction for each time the tool is raised.

Having described my invention, what I claim as new and desire to secure by Letters Patent, is,—

1. The combination of a motor, wheels driven thereby, a supporting frame, a cable pivotally secured to opposite sides of said wheels, pulleys over which the cable passes, a shaft operated by the cable, a tool operated by the shaft, means for giving the tool and shaft a reversed motion and for intermittently raising them, and means for changing the operation of the tool and shaft to a continuous motion, and for holding the tool down upon the work, substantially as described.

2. The combination of a motor, wheels driven thereby and a supporting frame, a vertical shaft pivotally supported in the frame, a tool operated by the shaft, a walking beam operated by the motor, means connecting the walking beam with the shaft whereby the shaft and tool are intermittently raised, and means for changing the operation of the shaft and tool to a continuous motion and for holding the tool down upon the work, substantially as described.

In testimony whereof I have hereunto signed my name in the presence of two subscribing witnesses.

OSCAR A. OLSON.

Witnesses:
JOSEPH ROBERTS,
JOHN G. BURKET.

---

Copies of this patent may be obtained for five cents each, by addressing the "Commissioner of Patents, Washington, D. C."